Patented June 3, 1952

2,599,236

UNITED STATES PATENT OFFICE 2,599,236

MANUFACTURE OF SILICA BRICK FROM HIGHLY SILICEOUS SANDS

Friedrich Wilhelm Cramer and Otto Wilhelm Franz Saffran, Bochum-Dahlhausen, Germany, assignors to Dr. C. Otto & Company, G. m. b. H., Bochum, Germany, a German company No Drawing. Application April 26, 1950, Serial No. 158,342. In Great Britain May 19, 1949

6 Claims. (Cl. 25—156)

The present invention relates to the manufacture of silica refractories, such as the silica bricks and other molded and fired masses consisting mainly of silica and sometimes designated "silica shapes," which are commonly used in the construction of by-product coke ovens and other high temperature furnaces. The general object of the present invention is to provide novel and effective methods for use in the manufacture of silica refractories from one or another of various highly siliceous materials such as gravel, flint, rock quartzite, and sand of such chemical composition and character as to have in some cases at least, a transformation capacity so poor that such materials have not heretofore been in the manufacture of silica furnace refractories except to a limited extent as aggregates mixed with other siliceous materials.

Silica refractories are generally manufactured from quartzites which occur naturally at comparatively few places, and the known deposits in some parts of the world have been heavily worked and approach exhaustion. In the past, numerous proposals for the production of silica refractories from siliceous sand and other non-quartzite siliceous materials have been made, but none of those proposals have been commercially successful.

We have discovered, however, that satisfactory silica refractories can be made from highly siliceous non-quartzite materials, by prebaking the siliceous material in the form of grains of sand or other relatively small particles, while keeping the particles continuously in motion. In practice, the prebaking operation may well be carried out in a rotary tube kiln or furnace, in which the temperatures attained are high enough to transform all, or a substantial portion at least, of the siliceous material into tridymite or cristobalite, as may be desired. To facilitate the desired transformation of the siliceous material, the siliceous particles may be mixed with a mineralizer. The latter may well be in the form of a solution of a soluble mineralizer such as $Na_2CO_3$, or NaCl. In order to insure the addition to each sand particle of the proper amount of soluble mineralizer, it is necessary to dry the siliceous material while the latter is in constant motion, as by passing it through a rotary drying drum. The siliceous material particles subject to the prebaking operation are of sizes smaller than 10 millimeters, and their relatively small sizes permit the individual particles to be rapidly heated up to temperatures of the order of 1550° C. required for the complete or partial transformation of the siliceous material into cristobalite, if desired. The small size of the particles also makes it practically feasible to coat the particles with suitable amounts of a soluble mineralizer as above described. It has long been known that the transformation of quartzite can be accelerated by adding mineralizers, such for example as alkali oxides, to the quartzite material which is to be pressed into bricks or other silica refractories, and then fired to effect the desired transformation. The practice has been open to the objection, however, that the added mineralizers often accelerate the transformation to such a degree that the sudden swelling of the bricks or other parts being formed, occurring as transformation is effected, results in objectionable cracking of said parts. The use of soluble mineralizer solutions in the pressed parts has been found impractical, since the evaporating water carries much of the mineralizers to the surfaces of the parts, and thus objectionably reduces the transformation effect in the core portions of the bricks.

The grains of sand or analogous small siliceous particles transformed into tridymite or cristobalite by prebaking in accordance with the present invention, are thereby so modified in structure that they become brittle and therefore can be easily triturated. In consequence, such prebaked particles can be readily ground in a pug mill preparatory to their mixture with the usual quantity of calcium hydroxide, sulphate solution, and water to form the plastic material to be pressed into the form bricks or other refractory masses. After the bricks or other silica refractories thus formed are dried, they may be baked or fired in a tunnel kiln in which the maximum temperature obtained should be about 1350° C. to 1400° C. In view of the fact that tridymite and cristobalite have crystal transformation points between 100° and 300° C., the heating up and cooling down within the temperature range between 0° and 300° must be relatively slow; whereas, the temperature change at other temperatures may be quite rapid. Silica bricks manufactured in accordance with the present invention are subject to only minor swelling in the firing operation, and hence, vary little in size.

In an alternative method of preparing the siliceous material, a part of the prebaked sand is reduced to the desired grain size in a suitable mill such as a mill of a type used in the fine ceramic industry, for example, in a drum mill provided with a flint lining and in which flint stones served as grinding bodies. Preparatory to such grinding, the sand is preferably wetted, and in such case, it must be dried later on, in a centrifugal machine. The fine ground and unground portions of siliceous particles are mixed with lime and sulphate solutions, and then pressed into shapes. It is possible, of course, to use suitable sub-divided quartzite, gravel, flint stones, etc., instead of sand, in making silica bricks and other refractories in accordance with the present invention. It is also practical in some cases, to make silica refractories in which only a part of the raw material has been prebaked as above described.

Having now described our invention, what we claim as new and desire to secure by Letters Patent, is:

1. The method of manufacturing silica refractories of highly siliceous particles in which said material is prebaked and in which the particles prebaked are kept in motion during the prebaking operation and in which the prebaked material is thereafter molded into refractories and in which said refractories are fired at temperatures in the range of about 1350° C. to about 1400° C.

2. A method as specified in claim 1, in which the raw material is passed through and prebaked in a rotating tube furnace.

3. A method as specified in claim 1, in which the raw material particles are prebaked in admixture with a mineralizer.

4. A method as specified in claim 1, in which the raw material particles are mixed with a soluble mineralizer dissolved in water and are thereafter dried while being kept in constant motion.

5. A method as specified in claim 1, in which the particles are prebaked at temperatures sufficiently high and for a period sufficiently prolonged to transform particles at least partially into cristobalite or tridymite.

6. A method as specified in claim 1, in which the raw material is mixed with a mineralizer solution in which the mineralizer is one of the group consisting of sodium chloride, sodium carbonate, and potassium carbonate.

FRIEDRICH WILHELM CRAMER.
OTTO WILHELM FRANZ SAFFRAN.

REFERENCES CITED

The following references are of record in the file of this patent:

UNITED STATES PATENTS

| Number | Name | Date |
|---|---|---|
| 1,583,521 | Boynton | May 4, 1926 |
| 1,677,701 | Alton | July 17, 1928 |
| 1,805,020 | Smith | May 12, 1931 |
| 2,478,757 | Foster | Aug. 9, 1949 |